[12] United States Patent
Gessel et al.

[10] Patent No.: US 10,327,386 B2
[45] Date of Patent: Jun. 25, 2019

[54] HEADER FOR AN AGRICULTURAL HARVESTER WITH INDEPENDENT SUB-SYSTEM DRIVES

[71] Applicant: CNH Industrial America LLC, New Holland, PA (US)

[72] Inventors: James M. Gessel, Geneseo, IL (US); Jaclyn Raetzman, Lemont, IL (US); Joel T. Cook, Lititz, PA (US); Nicholas J. Laufenberg, Glen Ellyn, IL (US); Jay D. Schroeder, Coal Valley, IL (US)

[73] Assignee: CNH Industrial America LLC, New Holland, PA (US)

[ * ] Notice: Subject to any disclaimer, the term of this patent is extended or adjusted under 35 U.S.C. 154(b) by 48 days.

[21] Appl. No.: 15/407,967

[22] Filed: Jan. 17, 2017

[65] Prior Publication Data

US 2017/0118916 A1   May 4, 2017

Related U.S. Application Data

[62] Division of application No. 14/259,464, filed on Apr. 23, 2014, now Pat. No. 9,578,804.

[51] Int. Cl.
*A01D 69/00* (2006.01)
*A01D 45/02* (2006.01)
*A01D 43/08* (2006.01)

[52] U.S. Cl.
CPC .............. *A01D 69/00* (2013.01); *A01D 43/08* (2013.01); *A01D 45/021* (2013.01); *A01D 45/023* (2013.01); *A01D 45/025* (2013.01)

[58] Field of Classification Search
CPC .. A01D 45/021; A01D 41/142; A01D 43/082; A01D 45/025; A01D 34/8355; A01D 57/22; A01D 69/00; A01D 45/023; A01D 43/08

See application file for complete search history.

[56] References Cited

U.S. PATENT DOCUMENTS 2,418,575 A * 4/1947 Christiansen ........ A01D 25/042
                                                          171/36
2,442,520 A    6/1948 Sickle
3,808,783 A    5/1974 Sutherland et al.
(Continued)

FOREIGN PATENT DOCUMENTS

DE      102012014081 A1    1/2014

OTHER PUBLICATIONS

EP15164632, Search Report and Opinion, dated Sep. 22, 2015, 5 pages.

*Primary Examiner* — Arpad Fabian-Kovacs
(74) *Attorney, Agent, or Firm* — Patrick M. Sheldrake; Peter K. Zacharias

[57] ABSTRACT

A header which is couplable with a base unit of an agricultural harvester. The header includes a rotatably driven first sub-system, a rotatably driven second sub-system, a first input drive, and a second input drive. The first input drive is mechanically couplable with the base unit. The first input drive is configured for driving the first sub-system at a first operating speed. The second input drive is mechanically couplable with the base unit. The second input drive is configured for driving the second sub-system at a second operating speed which is independent of the first operating speed.

14 Claims, 4 Drawing Sheets

(56) References Cited

U.S. PATENT DOCUMENTS

| | | | |
|---|---|---|---|
| 3,961,466 | A | 6/1976 | Martin et al. |
| 4,115,983 | A | 9/1978 | Barnes et al. |
| 4,269,017 | A | 5/1981 | deBuhr et al. |
| 5,330,114 | A | 7/1994 | Trenkamp et al. |
| 5,921,070 | A | 7/1999 | Chamberlain |
| 5,927,054 | A | 7/1999 | Chamberlain |
| 6,073,429 | A | 6/2000 | Wuebbels et al. |
| 6,119,442 | A | 9/2000 | Hale |
| 6,370,853 | B1 | 4/2002 | Randall et al. |
| 6,516,599 | B1 | 2/2003 | Clarke |
| 7,047,717 | B1 * | 5/2006 | Wolters ............... A01D 45/021 56/60 |
| 7,062,897 | B2 * | 6/2006 | Rickert ............... A01D 45/021 56/103 |
| 7,189,160 | B2 | 3/2007 | Pirro |
| 7,739,861 | B2 * | 6/2010 | Mackin ............... A01D 75/182 56/10.2 G |
| 7,874,134 | B1 * | 1/2011 | Hoffman ............... A01D 45/023 56/119 |
| 7,874,135 | B2 | 1/2011 | Nagy et al. |
| 7,937,918 | B1 | 5/2011 | Mossman |
| 8,104,254 | B2 | 1/2012 | Luetke-Harmann et al. |
| 8,534,036 | B2 | 9/2013 | Zegota et al. |
| 9,295,196 | B2 * | 3/2016 | Surmann ............... A01D 45/021 |
| 9,578,804 | B2 * | 2/2017 | Gessel ............... A01D 43/08 |
| 2001/0003237 | A1 * | 6/2001 | Wolters ............... A01D 45/021 56/64 |
| 2004/0060271 | A1 | 4/2004 | Ameye |
| 2005/0279073 | A1 | 12/2005 | Clauss et al. |
| 2006/0191251 | A1 | 8/2006 | Pirro et al. |
| 2007/0197327 | A1 | 8/2007 | Arnold et al. |
| 2007/0289281 | A1 | 12/2007 | Altepost et al. |
| 2009/0192734 | A1 | 7/2009 | Mackin |
| 2010/0300057 | A1 | 12/2010 | Luetke-Harmann et al. |
| 2012/0042618 | A1 | 2/2012 | Lohrentz et al. |
| 2012/0055131 | A1 | 3/2012 | Zegota et al. |
| 2014/0020354 | A1 | 1/2014 | Tilly et al. |
| 2015/0257337 | A1 | 9/2015 | Schrattenecker |

* cited by examiner

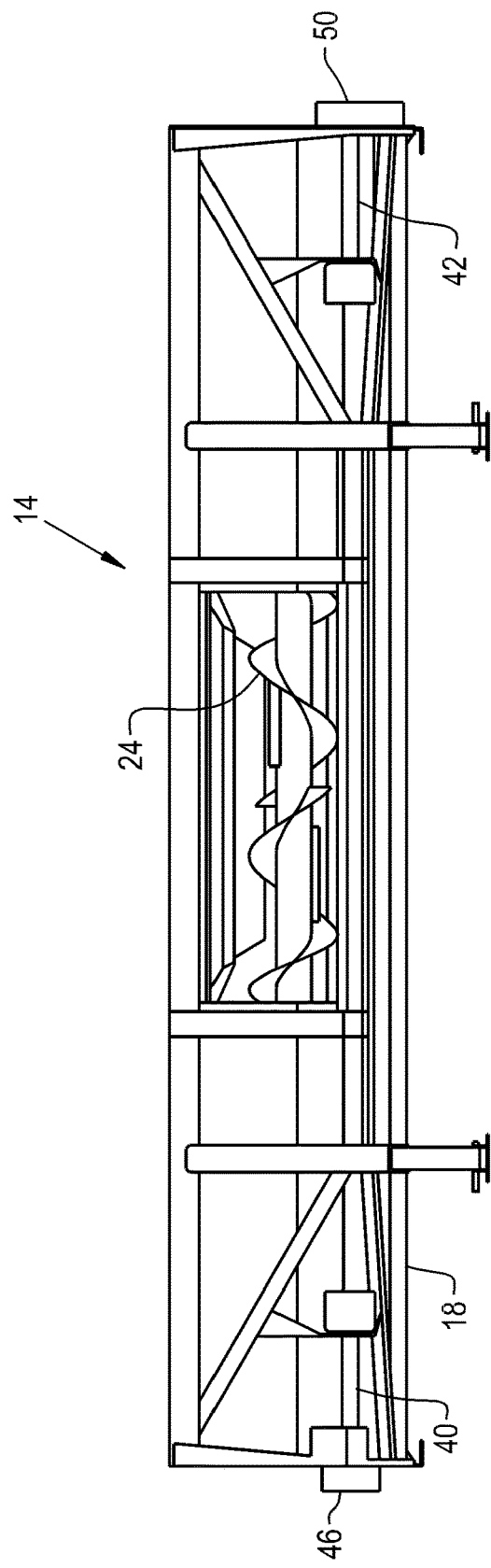

HEADER FOR AN AGRICULTURAL HARVESTER WITH INDEPENDENT SUB-SYSTEM DRIVES

CROSS REFERENCE TO RELATED APPLICATION

This application is a divisional of U.S. patent application Ser. No. 14/259,464, entitled "Header for an Agricultural Harvester with Independent Sub-System Drives" and filed Apr. 23, 2014, the contents of which are incorporated herein by reference.

FIELD OF THE INVENTION

The present disclosure relates to agricultural harvesters, and, more particularly, to header configurations for such harvesters.

BACKGROUND OF THE INVENTION

An agricultural vehicle known as a "combine" harvester is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

A "header" can broadly include row crop headers (such as corn headers) and cutting platforms (such as bean headers). In the case of a corn header, the header typically includes a number of row units with each row unit including a feed/snapping unit positioned at the bottom side thereof. Each feed/snapping unit typically includes a pair of stripper plates spaced apart from each other and extending in a direction of the row crop, a pair of stalk rolls positioned underneath the stripper plates, and a pair of gathering chains for moving the stalks into the space between the stripper plates and moving the stripped ears of corn rearwardly. It is also known to provide the header with a number of chopping units, with each chopping unit being associated with a respective row unit. As the corn stalks are stripped downwardly through the stripper plates by the stalk rolls, the chopping units chop the stalks, leaves, etc. (also known as "material other than grain" or MOG) into finer pieces which are then distributed onto the field.

It is known to separate the mechanical input drive at the header between the feed/snapping units and the chopping units. A single mechanical input drive is provided on the header, and the input drive is split in a parallel manner onboard the header between the feed/snapping units and the chopping units. The parallel feed from the single input drive to the feed/snapping units can be configured with a variable operating speed by varying the shaft speed of the input drive, and the other parallel feed to the chopping units can be somewhat constant at a given input drive speed by varying a gear ratio within a transmission. However, as the operating speed of the single input drive changes the operating speed of the chopping units also changes. During this transitional speed change, this can result in an operating speed of the chopping units which is below a desired threshold operating speed as the input drive speed from the base unit changes. Moreover, since the shaft speed of the single input drive can infinitely vary between upper and lower operating ranges, but the transmission only has discrete stepped gear ratios, the operating speed of the chopping units is not constant.

What is needed in the art is a header for an agricultural harvester which better accommodates different drive needs of various sub-systems onboard the header.

SUMMARY OF THE INVENTION

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

The present disclosure, in one form, provides a header with multiple mechanical input drives on the header, with each input drive driving a separate sub-system on the header and being operated at independent operating speeds relative to each other. The operating speed of one of the input drives can be constant.

The invention in one form is directed to a header for an agricultural harvester, including a plurality of row units, a plurality of feed/snapping units, and a plurality of chopping units. Each feed/snapping unit is associated with a respective said row unit and operable at a first operating speed. Each chopping unit is associated with at least one respective feed/snapping unit and operable at a constant second operating speed, independent of the first operating speed.

The invention in another form is directed to a header which is couplable with a base unit of an agricultural harvester. The header includes a rotatably driven first sub-system, a rotatably driven second sub-system, a first input drive which is mechanically couplable with the base unit, and a second input drive which is mechanically couplable with the base unit. The first input drive is configured for driving the first sub-system at a first operating speed. The second input drive is configured for driving the second sub-system at a second operating speed which is independent of the first operating speed.

The invention in yet another form is directed to an agricultural harvester including a base unit and a header carried by the base unit. The header includes a plurality of row units, a plurality of feed/snapping units, and a plurality of chopping units. Each feed/snapping unit is associated with a respective row unit and operable at a first operating speed. Each chopping unit is associated with at least one respective feed/snapping unit and operable at a constant second operating speed, independent of the first operating speed.

An advantage of the present disclosure is that multiple mechanical input drives on the header allow segregated power from each input drive to one or more corresponding sub-systems onboard the header.

Another advantage is that the multiple input drives provide greater flexibility and control over the operating speed of the associated sub-systems onboard the header.

Yet another advantage is that when the sub-systems on the header are configured as feed/snapping units and chopping units, the chopping units can be operated at a constant operating speed regardless of the operating speed of the feed/snapping units (which can vary).

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 4 is a rear view of the header shown in FIGS. 1-3.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

Figure 1:
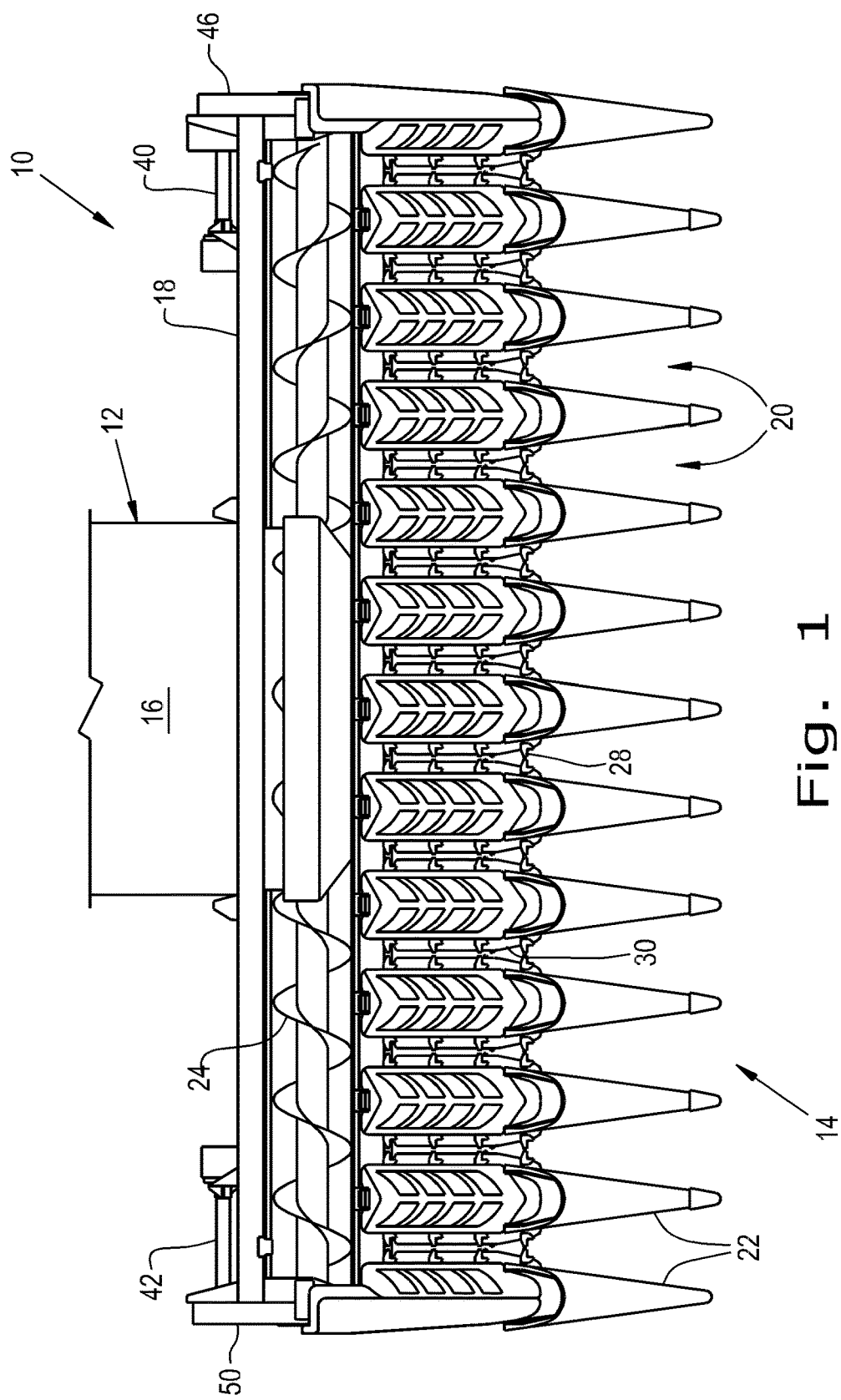
FIG. 1 is a top view of an agricultural harvester, including an embodiment of a header of the present disclosure coupled with a portion of a combine.

Referring now to the drawings, and more particularly to FIG. 1, there is shown an agricultural harvester 10 which generally includes a base unit 12 and an embodiment of a header 14 of the present disclosure. In the illustrated embodiment, base unit 12 is in the form of a combine with only a portion of a feeder housing 16 being shown for simplicity sake. The combine 12 may include a number of conventional systems and sub-systems for threshing, separating, cleaning, etc. It is also to be understood that agricultural harvester 10 may be configured as a different type of harvester, such as a sugar cane harvester, cotton harvester, forage harvester, etc.

Header 14 can include a frame 18 supporting a number of structural components. For example, when configured as a corn header as shown in FIG. 1, header 14 can include a number of row units 20 separated by snouts 22. In the embodiment shown, header 14 is configured as a 12 row corn header. Each row unit 20 generally separates the ears of corn from most of the MOG and conveys the ears of corn and some MOG toward the rear of header 14, where it is conveyed laterally inward toward feeder housing 16 using a double pitch cross auger 24. The ears of corn and MOG can then transported into combine 12 for further threshing, separating and cleaning.

Figure 2:
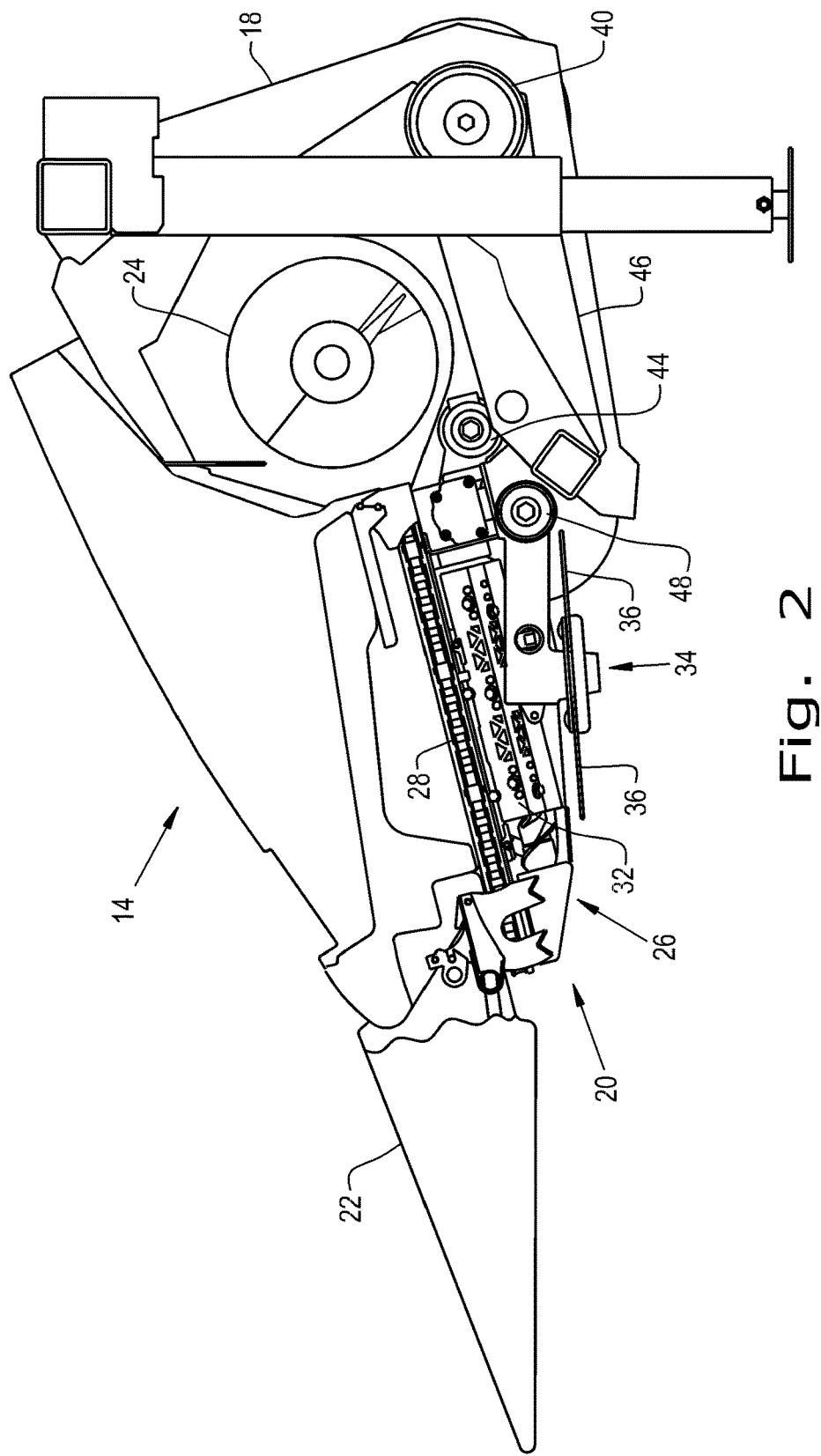
FIG. 2 is an end view of the header shown in FIG. 1, with some of the sheet metal removed to expose a row unit and chopping unit.
Figure 3:
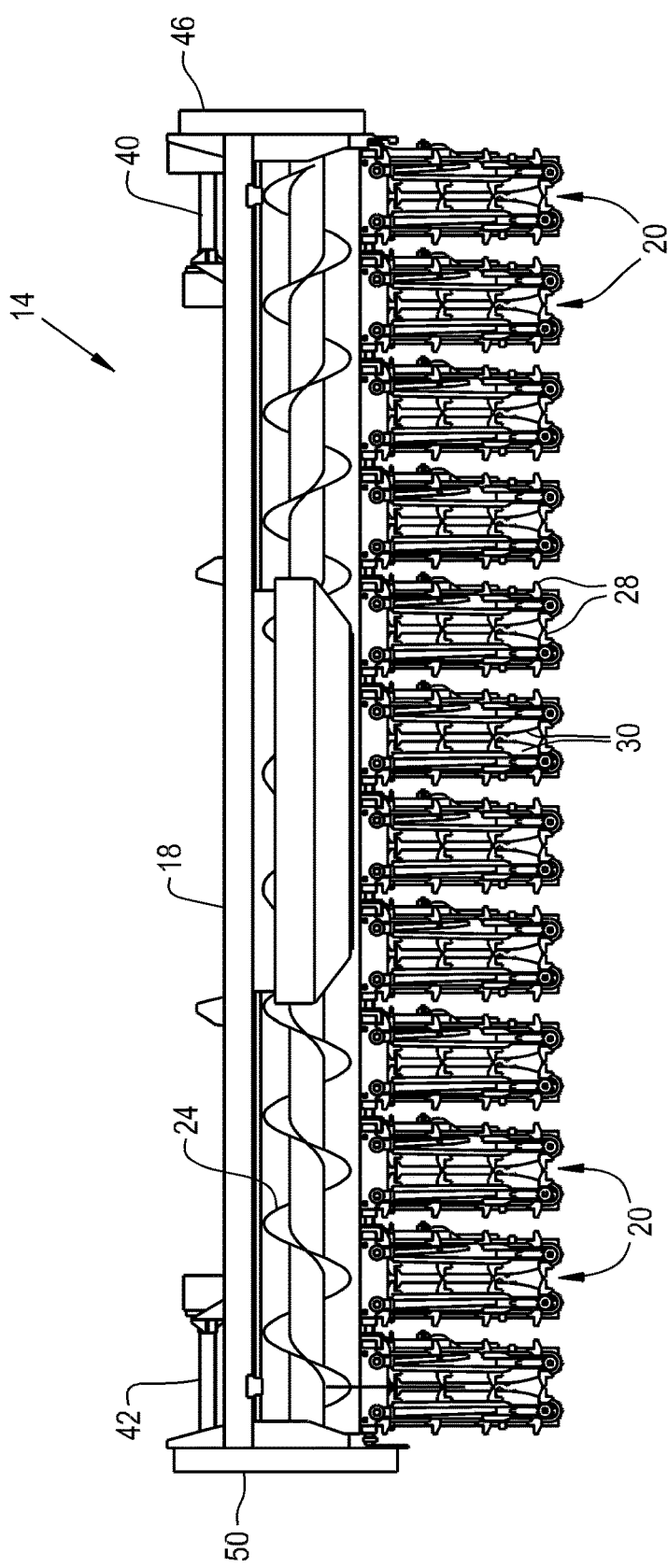
FIG. 3 is a top view of the header shown in FIGS. 1 and 2, with the snouts associated with the row units removed.

Referring now to FIGS. 2 and 3, each row unit 20 can include a feed/snapping unit 26 which together define a first sub-system of header 14. Each feed/snapping unit 26 can include a pair of gathering chains 28, stripper plates 30 and stalk rolls 32. As the combine 12 moves in a forward travel direction while harvesting, the gathering chains 28 move the corn stalks (not shown) in a rearward direction in the space between stripper plates 30. As the stalks move rearwardly, the stalk rolls 32 pull the stalks in a downward direction and as the ears of corn on the stalks hit the stripper plates 30, the ears are stripped from the stalk and lie on top of the stripper plates 30. The gathering chains 28 then move the ears of corn and some MOG in a rearward direction toward the cross auger 24.

Positioned below each feed/snapping unit 26 can also be a chopping unit 34 which together define a second sub-system of header 14. As the corn stalks are stripped downwardly through the stripper plates 30 by the stalk rolls 32, the chopping units 34 chop the stalks, leaves, etc. (MOG) into finer pieces which are then distributed onto the field. Each chopping unit 34 is associated with at least one respective row unit 20 and includes one or more cutting blades 36. In the illustrated embodiment, each chopping unit 34 includes a pair of cutting blades 36 which rotate at a desired rotational speed providing a desired cutting tip speed (velocity) at the outermost end of each blade. The illustrated chopping units 34, for example, have a desired or target rotational speed of approximately 2800 RPM.

According to an aspect of the present application, multiple input drives are provided on the header 14 corresponding to the number of sub-systems which are separately driven on header 14 (FIGS. 1-4). As indicated above, in the embodiment of header 14 shown and described herein, a first sub-system is assumed to correspond to the plurality of feed/snapping units 26 and a second sub-system is assumed to correspond to the plurality of chopping units 34. The sub-systems onboard header 14 which are to be separately driven can also be differently configured, such as a cutter bar and/or reel on a bean header, etc.

More particularly, header 14 can include a first input drive 40 and a second input drive 42 which may each be mechanically coupled with corresponding output drives (not specifically shown) carried by combine 12. First input drive 40 and second input drive 42 may each be coupled with the corresponding output drives on combine 12 using any suitable coupling structure, such as a telescoping power take off (PTO) shaft or other suitable coupler. Header 14 is shown with the first input drive 40 being located at one end (left) of the header 14 and the second input drive 42 being located at an opposite end (right) of the header 14, on opposite sides of feeder housing 16. However, the orientation of the first input drive 40 and second input drive 42 can be switched, or both input drives 40 and 42 can be located on the same side of the feeder housing 16. Moreover, more than two input drives can also be provided.

First input drive 40 can be configured as an input drive shaft which is coupled with a common drive shaft 44 which extends across header 14 and mechanically drives each of the feed/snapping units 26 at a first operating speed (FIG. 2). Suitable gears, belts, pulleys, etc within a housing 46 at the left end of header 14 can be used to interconnect the first input drive 40 with common drive shaft 44. The operating speed of feed/snapping units 26 can be variable to accommodate varying field conditions during harvesting. For example, header 14 can include a controllable component used to control the operating speed of feed/snapping units 26, such as a continuously variable transmission (CVT), different sized chain drive sprockets, belt drive pulleys, interchangeable gears to modify drive ratios, a shiftable planetary gear set, etc. Alternatively, the operating speed of the output shaft from combine 12 which drives the first input drive 40 can be varied, while the output shaft from combine 12 which drives the second input drive 42 can be maintaining substantially constant. This results in the drive for the chopping units 34 and feed/snapping units 26 being split onboard the combine 12 rather than the header 14.

Second input drive 42 can likewise be configured as an input drive shaft which is coupled with a common drive shaft 48 which extends across header 14 and mechanically drives each of the chopping units 34 at a second operating speed (FIG. 2). Suitable gears, belts, pulleys, etc within a housing 50 at the right end of header 14 can be used to interconnect the second input drive 42 with common drive shaft 48. Each chopping unit 34 can be operated at a desired operating speed to provide adequate cutting of the MOG conveyed downwardly by an associated feed/snapping unit 26. Accordingly, each chopping unit 34 can be operated at a constant operating speed which is independent of the rotational speed of the feed/snapping units 26. The second input drive 42 is set at a desired constant operating speed, and effective cutting of the MOG always occurs regardless of the selected variable operating speed of the feed/snapping units 26. The phrase "constant operating speed" as used in this disclosure is meant to be the selected speed at which the chopping units 34 operate, by way of the second input drive 42, which can vary through operator input by up to +/−20% (e.g., by throttling up or throttling down the internal combustion engine, or maintaining a rated engine speed and adjusting the output speed of the output drive shaft from the base unit). Once set by the operator, the chopping units 34 then operate at a corresponding substantially constant operating speed.

At a rated operating (PTO) speed of combine 12, the chopping units 34 can be configured to be incapable of being adjusted by an operator. Using a second input drive 42 as described above, and with the combine 12 operating at the rated PTO speed, the second input drive 42 has no provisions which would allow the operator to adjust the operating speed of the chopping units 34. In this manner, the chopping units 34 always have a predetermined blade tip operating speed to ensure that the crop material is adequately chopped prior to being returned to the ground. In the embodiment described above, the chopping units 34 are driven in a direct drive manner by the second input drive 42 that is driven at a constant operating speed from the combine 12. Neither the combine 12 nor the header 14 has any adjustment feature that would allow the rotational speed of the chopping units 34 to be adjusted.

In the embodiment shown and described above, the combine includes two output shafts which drive a first input drive 40 and second input drive 42 onboard the header 14. However, in another embodiment (not shown), it is also possible to use a single output shaft from the combine 12 which drives both the first input drive 40 and second input drive 42 onboard the header 14. For example, a single output shaft from the combine 12 can directly drive the first input drive 40 associated with the chopping units 34, and a gearbox or the like in the driveline can split the rotational power in a parallel manner to drive the second input drive 42 associated with the feed/snapping units 26. A CVT or other suitable controllable component as described above can be used to vary the operating speed of the feed/snapping units 26. In the case of a combine having two output shafts, the first and second input drives 40 and 42 are directly coupled with the combine, whereas in the case of a combine having a single output shaft, the first input drive 40 would be directly coupled with the combine and the second input drive 42 would be indirectly coupled with the combine by way of the first input drive 40.

In another embodiment, such as a smaller corn header (e.g., a 6 row header), it might not be cost effective to run separate output shafts from the combine, with two separate input drives on the header to the chopping units and to the row units. The smaller headers are more likely to be used with a combine having a fixed speed feeder drive and again it would not be cost effective to add a variable speed unit to the row unit drive. One possibility on such a header might be to run a series configuration from the combine, to the chopper units, and then to the feed/snapping units, with a manual adjustment for the operator to adjust the speed of the feed/snapping units. For example, the combine can have a single output shaft which would connect to one end of the header (e.g., right end). From the right end, the drive shaft for the chopping units would extend across to the other end of the header (e.g., left end) and operate at a fixed speed for the chopping units. Then from the other end of the header, this drive shaft would connect with another drive shaft extending across the header for the feed/snapping units. A manually adjustable component, such as chain drive with changeable sprockets or a small gearbox with a 2 or 3 speed ratio could be placed on the header between the two drive shafts, accessible to an operator. Configured as such, the chopping units would always run at a constant speed and the operator could manually change the row unit speed by changing a sprocket or gear level on the end of the header. This would eliminate the need for two input drives on the smaller headers.

While this invention has been described with respect to at least one embodiment, the present disclosure can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An elongated header having opposite ends which is couplable with a base unit of an agricultural harvester, the header comprising:
   a rotatably driven first sub-system;
   a rotatably driven second sub-system;
   a first input drive at one end of said elongated header which is mechanically couplable with the base unit, the first input drive being configured for driving the first sub-system at a first operating speed; and
   a second input drive at an opposite end of said elongated header which is mechanically couplable with the base unit separately from said first input drive, the second input drive being configured for driving the second sub-system at a second operating speed which is independent of the first operating speed.

2. The header of claim 1, wherein the first operating speed is a variable operating speed.

3. The header of claim 1, wherein the first sub-system includes a plurality of feed/snapping units, and the second sub-system includes a plurality of chopping units.

4. The header of claim 3, wherein the header includes a plurality of row units, and wherein each of the plurality of row units includes one of the feed/snapping units and one of the chopping units associated therewith.

5. The header of claim 4, wherein each of the chopping units includes at least one cutting blade, and the second operating speed corresponds to a predetermined tip speed of the at least one cutting blade.

6. The header of claim 4, wherein the first input drive includes a first input drive shaft and the second input drive includes a second input drive shaft.

7. The header of claim 6, wherein the first input drive shaft is connected with a first common drive shaft extending across the header and coupled with each of the feed/snapping units, and the second input drive shaft is connected with a second common drive shaft extending across the header and coupled with each of the chopping units.

8. An elongated header having opposite ends for an agricultural harvester, comprising:
 a plurality of row units;
 a rotatably driven first sub-system;
 a rotatably driven second sub-system;
 a first input drive at one end of said elongated header which is mechanically couplable with the base unit, the first input drive being configured for driving the first sub-system at a first operating speed; and
 a second input drive at an opposite end of said elongated header which is mechanically couplable with the base unit separately from said first input drive, the second input drive being configured for driving the second sub-system at a second operating speed which is independent of the first operating speed.

9. The header of claim 8, wherein the first operating speed is a variable operating speed.

10. The header of claim 8, wherein the first sub-system includes a plurality of feed/snapping units, and the second sub-system includes a plurality of chopping units.

11. The header of claim 10, wherein each of the plurality of row units includes one of the feed/snapping units and one of the chopping units associated therewith.

12. The header of claim 11, wherein each of the chopping units includes at least one cutting blade, and the second operating speed corresponds to a predetermined tip speed of the at least one cutting blade.

13. The header of claim 10, wherein the first input drive includes a first input drive shaft and the second input drive includes a second input drive shaft.

14. The header of claim 13, wherein the first input drive shaft is connected with a first common drive shaft extending across the header and coupled with each of the feed/snapping units, and the second input drive shaft is connected with a second common drive shaft extending across the header and coupled with each of the chopping units.

* * * * *